United States Patent
Okkel et al.

(10) Patent No.: US 11,623,977 B2
(45) Date of Patent: Apr. 11, 2023

(54) POLYMER WITH POLYETHER POLYESTER SEGMENT AND POLYSILOXANE SEGMENT

(71) Applicant: BYK-Chemie GmbH, Wesel (DE)

(72) Inventors: Andreas Okkel, Wesel (DE); Wolfgang Griesel, Wesel (DE); Guillaume Wojciech Jaunky, Wesel (DE); Ramona Scholten, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 373 days.

(21) Appl. No.: 15/733,940

(22) PCT Filed: May 16, 2019

(86) PCT No.: PCT/EP2019/062729
§ 371 (c)(1),
(2) Date: Dec. 1, 2020

(87) PCT Pub. No.: WO2019/233734
PCT Pub. Date: Dec. 12, 2019

(65) Prior Publication Data
US 2021/0221948 A1     Jul. 22, 2021

(30) Foreign Application Priority Data

Jun. 5, 2018 (EP) .................................... 18175965

(51) Int. Cl.
| | | |
|---|---|---|
| *C08G 77/445* | (2006.01) | |
| *C09D 7/65* | (2018.01) | |
| *C08G 63/664* | (2006.01) | |
| *C08G 63/695* | (2006.01) | |
| *C08G 77/12* | (2006.01) | |
| *C08G 77/46* | (2006.01) | |
| *C08L 67/04* | (2006.01) | |
| *C09D 167/04* | (2006.01) | |
| *C08G 63/08* | (2006.01) | |
| *C08G 65/22* | (2006.01) | |
| *C08G 65/26* | (2006.01) | |
| *C08G 63/66* | (2006.01) | |

(52) U.S. Cl.
CPC ........... *C08G 77/445* (2013.01); *C08G 63/08* (2013.01); *C08G 63/66* (2013.01); *C08G 63/664* (2013.01); *C08G 63/6952* (2013.01); *C08G 65/22* (2013.01); *C08G 65/26* (2013.01); *C08G 65/2615* (2013.01); *C08G 77/12* (2013.01); *C08G 77/46* (2013.01); *C08L 67/04* (2013.01); *C09D 7/65* (2018.01); *C09D 167/04* (2013.01)

(58) Field of Classification Search
None
See application file for complete search history.

(56) References Cited

U.S. PATENT DOCUMENTS

| | | | |
|---|---|---|---|
| 3,778,458 A * | 12/1973 | Morehouse | ............ C08G 77/42 556/440 |
| 4,791,189 A | 12/1988 | Yu | |
| 4,812,518 A | 3/1989 | Haubennestel et al. | |
| 5,512,640 A | 4/1996 | Osawa et al. | |
| 5,858,894 A | 1/1999 | Nagashima et al. | |
| 7,504,469 B2 | 3/2009 | Haubennestel et al. | |
| 7,838,614 B2 * | 11/2010 | Thum | ................. C08G 77/445 528/10 |
| 8,729,207 B2 * | 5/2014 | Hartung | ............... C08G 77/445 528/14 |
| 9,938,432 B2 | 4/2018 | Jaunky et al. | |
| 2010/0240842 A1 | 9/2010 | Frank et al. | |
| 2011/0282027 A1 * | 11/2011 | Deglmann | ......... C08G 65/2672 528/405 |
| 2012/0010302 A1 | 1/2012 | Hartung et al. | |
| 2013/0041098 A1 | 2/2013 | Arkles et al. | |
| 2018/0016392 A1 * | 1/2018 | Lobert | ............... C08G 65/3322 |

FOREIGN PATENT DOCUMENTS

| | | | |
|---|---|---|---|
| CN | 102181048 A | | 9/2011 |
| CN | 104098776 A | * | 10/2014 |
| DE | 102006031152 A1 | | 1/2008 |
| EP | 0217364 B1 | | 1/1993 |
| EP | 1985645 A2 | | 10/2008 |
| JP | H02099558 A | | 4/1990 |
| JP | H03203952 A | | 9/1991 |
| JP | H06128380 A | | 5/1994 |
| JP | H08226082 A | | 9/1996 |
| JP | H09328556 A | | 12/1997 |
| JP | H01045425 A | | 2/1998 |
| JP | 2008161737 A | | 7/2008 |
| KR | 20150026269 A | | 3/2015 |
| WO | 2009086079 A2 | | 7/2009 |
| WO | 2016079319 A1 | | 5/2016 |

OTHER PUBLICATIONS

International Search Report and Written Opinion for International Application No. dated Jun. 6, 2019 (10 pages).
T. Suzuki, "Preparation of poly(dimethysiloxane) macromonomers by the 'initiator method': 2. Polymerization mechanism," Polymer, 1989, vol. 30, pp. 333-337.

* cited by examiner

*Primary Examiner* — Marc S Zimmer
(74) *Attorney, Agent, or Firm* — Fitch, Even, Tabin & Flannery, LLP

(57) ABSTRACT

The invention relates to a polymer comprising: a) at least one polyether polyester copolymer segment, wherein the polyether polyester copolymer comprises ether units selected from the group consisting of the formula (II) —[$CR^1_2$]$_n$—O—, wherein n is an integer of 2 to 4, $R^1$ represent independent of each other organic groups having 1 to 30 carbon atoms or hydrogen, and wherein in case n is equal to 2 at least one of the $R^1$ represents an ether group having the formula —$R^2$—O—$R^3$, wherein $R^2$ and $R^3$ independent of each other represent organic groups having 1 to 30 carbon atoms, and b) at least one polysiloxane segment linked to the at least one polyether polyester copolymer segment.

22 Claims, No Drawings

POLYMER WITH POLYETHER POLYESTER SEGMENT AND POLYSILOXANE SEGMENT

The invention relates to a polymer comprising at least one polyether polyester copolymer segment and at least one polysiloxane segment. The invention further relates to a process for preparing the polymer, to a liquid composition comprising the copolymer, to a process of coating a substrate, and to the use of the polymer for adapting surface properties.

U.S. Pat. No. 7,504,469 B describes polyester polysiloxane block copolymers. The polyester segment is prepared by ring-opening polymerization of epsilon caprolactone. The block copolymers are waxy solids. This detracts from providing the copolymers as a 100% active substance, for example when used as additive for a liquid coating composition. Concentrated solutions of the polycaprolactone-modified polysiloxane tend to crystallize out at low temperature, for example at 10° C. or lower. Often, already after one day of storage at 10° C. formation of turbidity and sediment is observed.

If the copolymer solution is not homogenous and is used as additive in a coating formulation, the substrate wetting and leveling may be negatively influenced and the resulting coating may be prone to surface defects such as cratering or pin holes.

To prevent such defects and to have a homogeneous product prior to use storage in a warm chamber may be required.

US 2012/001003002 A describes polyester-polysiloxane block copolymers. The polyester part is based on polysubstituted lactones as monomer units. The block copolymers are described to have a low tendency towards crystallization compared to known polyester polysiloxane copolymers. A drawback of the block copolymers described in this document is the limited commercial availability and high price of polysubstituted lactones required as starting material.

U.S. Pat. No. 3,778,458 describes lactone-silicone block copolymers containing a block of at least two siloxy units and a block of lactone units with or without oxyalkylene units of the formula $-[C_aH_{2a}]-$. The lactone-silicone block copolymers are described as normally solid and useful as surfactants and/or as foam stabilizers in the manufacture of foamed, cellular polyurethane materials.

There is an ongoing need for modified polysiloxane copolymers, which alleviate the above-mentioned problems. The polysiloxane copolymers preferably have good solubility, a low tendency towards crystallization, the capability to control the surface properties of coatings and polymeric objects in a desirable way, and preferably be based on reasonably priced raw materials readily available on a commercial scale.

The invention provides a polymer comprising:
a) at least one polyether polyester copolymer segment, wherein the polyether polyester copolymer comprises ether units selected from the group consisting of the formula (II) $-[CR^1_2]_n-O-$, wherein n is an integer of 2 to 4, $R^1$ independent of each other represent organic groups having 1 to 30 carbon atoms or hydrogen, and wherein in case n is equal to 2 at least one of the $R^1$ represents an ether group having the formula $-R^2-O-R^3$, wherein $R^2$ and $R^3$ independent of each other represent organic groups having 1 to 30 carbon atoms, and
b) at least one polysiloxane segment linked to the at least one polyether polyester copolymer segment.

In a second aspect of the invention, a process is provided for preparing the polymer of the invention, comprising the steps of:
a) preparing a polyester polyether copolymer segment by reacting a cyclic ester and a cyclic ether together in a ring-opening polymerization reaction, wherein the ring-opening polymerization reaction is started by a chain starter compound, which comprises at least one functional group selected from a hydroxyl group and an amine group, and wherein the polyether polyester copolymer comprises ether units selected from the group consisting of the formula (II) $-[CR^1_2]_n-O-$, wherein n is an integer of 2 to 4, $R^1$ independent of each other represent organic groups having 1 to 30 carbon atoms or hydrogen, and wherein in case n is equal to 2 at least one of the $R^1$ represents an ether group having the formula $-R^2-O-R^3$, wherein $R^2$ and $R^3$ independent of each other represent organic groups having 1 to 30 carbon atoms,
b) providing a polysiloxane having Si—H functional groups,
c) covalently linking the polyester polyether copolymer segment and the polysiloxane having Si—H functional groups.

The polyether polyester copolymer segment comprises ether units and ester units. The polyether polyester copolymer segment may be additionally comprise other units. Preferably, the polyether polyester copolymer chain is substantially completely constituted by the polyether polyester copolymer segment having ether units and ester units. An ester unit is a unit having an ester link to an adjacent unit. An ether unit is a unit having an ether link to an adjacent unit.

The polyether polyester copolymer comprises ether units selected from the group consisting of the formula (II) $-[CR^1_2]_n-O-$, wherein n is an integer of 2 to 4, $R^1$ independent of each other represent organic groups having 1 to 30 carbon atoms or hydrogen. The ether units respectively have 4, 6 or 8 $R^1$ groups depending on the integer n (1, 2 or 3), wherein each $R^1$ independent of each other represents an organic group having 1 to 20 carbon atoms or hydrogen. In case n is equal to 2 at least one of the $R^1$ represents an ether group having the formula $-R^2-O-R^3$, wherein $R^2$ and $R^3$ independent of each other represent organic groups having 1 to 30 carbon atoms.

Additionally, the at least one polysiloxane segment is linked to the at least one polyether polyester copolymer segment.

The polysiloxane segment of the polymer provides a capability to control surface properties of coatings and/or polymeric objects in a desirable way.

The composition of the polyether polyester copolymer segment may be selected in order to adapt the compatibility of the polymer to a matrix, such as a coating composition, a molding compound or a thermoplastic compound. Additionally, the composition of the at least one polyether polyester copolymer segment may be selected such that that the polymer has a good solubility in a solvent.

In particular, the polyether polyester copolymer segment having ether units of the formula (II) $-[CR^1_2]_n-O-$ as indicated above has a low tendency towards crystallization. As such, the polymer according to the present invention may be provided and used as additive in a substantially pure form, i.e. 100% of the additive, without using an organic solvent. Alternatively, a relatively saturated solution of the polymer in an organic solvent may be provided and used as additive. In any way, the amount of organic solvent in the additive is readily reduced.

As a result, the polymer, when used as additive and provided in a substantially pure form or as a substantially homogenous polymer solution thereof, remains stable at a low temperature, for example below 5 to 10° C. In particular, the polymer has substantially no tendency to crystallize at said low temperature in the pure form and/or in a solution thereof.

Additionally, the polymer according to the present invention is obtainable by a synthesis process based on presently available cyclic esters and cyclic ethers. Cyclic esters and cyclic ethers are reasonably priced raw materials, which are readily available on a commercial scale. As a result, the polymer may be provided in a cost effective way.

In the process for preparing the polyether polyester copolymer segment the chain starter compound comprises at least one functional group selected from a hydroxyl group and an amine group. In an exemplary embodiment, the chain starter compound is monofunctional. The at least one functional group of the monofunctional chain starter compound may be a hydroxyl group and may be a secondary amine group. In an alternative exemplary embodiment, the chain starter compound is multifunctional. The multifunctional chain starter compound may start the forming of at least two chains in the ring-opening polymerization reaction from the same chain starter compound.

In an exemplary embodiment, ether units and ester units of the polyether polyester copolymer segment are arranged in random order. Due to the random order of the ether and ester units in the polyether polyester copolymer segment, the low tendency towards crystallization of the polyether polyester copolymer segment is enhanced.

A random order of the ether and ester units in the copolymer according to the present invention is defined herein as that the ether units and the ester units are (both) distributed along the chain of the polyether polyester copolymer segment in an irregular way. In fact, a position of an ether linkage and a position of an ester linkage along said chain of the polyether polyester copolymer segment is accidental and not predictable. Moreover, due to its accidental nature, a first polymer has a first order of ether units and the ester units and a second polymer has a first order of ether units and the ester units, wherein the second order is different from the first order.

In an exemplary embodiment, in step a) of the process the cyclic ester and the cyclic ether are added substantially simultaneously into a reaction mixture, which is maintained in reaction conditions, such that the ether units and ester units of the polyester polyether copolymer segment are arranged in random order. The reaction conditions of the reaction mixture, such as temperature, catalyst and chain starter compound, are selected such that the added cyclic ester and cyclic ether may readily react in a ring-opening polymerization reaction to form said polyester polyether copolymer segment. In an embodiment, the cyclic ester and the cyclic ether may be added as a mixture thereof into the reaction mixture.

Alternatively, the cyclic ester and the cyclic ether may be added as separate streams thereof at substantially the same moment of one another such that the ether units and the ester units may react substantially simultaneously in the reaction mixture.

In any of these embodiments, an enrichment of the cyclic ester and the cyclic ether in the reaction mixture during step a) is prevented or at least restricted. Even in case of a difference in reactivity of the ring-opening polymerization reaction between the cyclic ester and the cyclic ether, an enrichment of the cyclic ester and the cyclic ether in the reaction mixture is prevented or restricted due to the controlled addition of the cyclic ester and the cyclic ether to the reaction mixture.

In an exemplary embodiment, the mass ratio of the polyether polyester copolymer segment with respect to the polysiloxane segment is from 15:85 to 75:25. The mass ratio enhances a low tendency of the polymer towards crystallization of the polyether polyester copolymer segment in the polymer at room temperature. Moreover, the mass ratio may be selected within said range in order to adapt the compatibility of the polymer to a matrix, such as a coating composition, a molding compound or a thermoplastic compound.

In an exemplary embodiment, the polyether polyester copolymer segment comprises ester units of the formula (I) —$(CH_2)_5$—C(=O)—O—.

The ester units of the formula (I) may be formed by a ring opening polymerisation reaction of epsilon-caprolactone. Epsilon-caprolactone is a readily available caprolactone, which may react both with itself and with cyclic ethers in a ring opening polymerisation reaction. Said units of the formula (I) are readily obtainable in a random order arrangement in conjunction with ether units.

In a preferred embodiment, the polyether polyester copolymer segment is formed by a ring opening polymerisation reaction of epsilon-caprolactone and a cyclic ether.

In an exemplary embodiment, n is equal to 2. In a particular embodiment, the ether units have one ether group having the formula —$R^2$—O—$R^3$, wherein $R^2$ and $R^3$ independent of each other represent organic groups having 1 to 30 carbon atoms. In examples the ether units having one ether group having the formula —$R^2$—O—$R^3$ are selected from the group consisting of alkyl substituted glycidyl ether, such as isopropyl glycidyl ether, aryl substituted glycidyl ether, such as naphthyl glycidyl ether, and aralkyl substituted glycidyl ether, such as cresyl glycidyl ether, cardanol glycidyl ether, guaiacol glycidyl ether and p-cumylphenyl glycidyl ether.

In exemplary embodiments, any of the alkyl substituted glycidyl ethers and aralkyl substituted glycidyl ethers may comprise an additional ether group. In an example, guaiacol glycidyl ether is 2-[(2-methoxyphenoxy) methyl]oxirane and comprises an methoxy group.

In exemplary embodiments, any of the alkyl substituted glycidyl ethers and aralkyl substituted glycidyl ethers may comprise an unsaturated alkyl radical. Said unsaturated alkyl radical comprises at least one of an alkene group and an alkyne group.

In a particular embodiment, the polyether polyester copolymer comprises ether units of the formula (IIa) —$CR^4_2$—$CR^5_2$—O—, wherein $R^4$ and $R^5$ independent of each other represent organic groups having 1 to 30 carbon atoms or hydrogen, and at least one of the $R^4$ and $R^5$ represents an ether group having the formula —$R^2$—O—$R^3$, wherein $R^2$ and $R^3$ independent of each other represent organic groups having 1 to 30 carbon atoms.

The units of the formula (IIa) may be formed by a ring opening polymerisation reaction of a substituted oxirane, which has at least one ether group having the formula —$R^2$—O—$R^3$ instead of a hydrogen. $R^2$ and $R^3$ independent of each other represent organic groups having 1 to 30 carbon atoms.

The organic groups of the ether units may in embodiments comprise one or more functional groups, such as a hydroxyl group or an amine group. In exemplary embodiments, said units of the formula (IIa) may be readily obtainable in a random order arrangement in conjunction with ester units.

In exemplary embodiments, an oxirane is selected from the group consisting of alkyl substituted glycidyl ether, aryl substituted glycidyl ether, and aralkyl substituted glycidyl ether. In exemplary embodiments, any of the alkyl substituted glycidyl ethers and aralkyl substituted glycidyl ethers may comprise an additional ether group. In an example, guaiacol glycidyl ether is 2-[(2-methoxyphenoxy) methyl] oxirane and comprises an methoxy group.

In exemplary embodiments, any of the alkyl substituted glycidyl ethers and aralkyl substituted glycidyl ethers may comprise an unsaturated alkyl radical. Said unsaturated alkyl radical comprises at least one of an alkene group and an alkyne group.

In an exemplary embodiment, n is equal to 3.

In a particular embodiment, the polyether polyester copolymer comprises units of the formula (IIb) —$CR^6_2$—$CR^7_2$—$CR^8_2$—O—, wherein $R^6$, $R^7$ and $R^8$ independent of each other represent organic groups having 1 to 20 carbon atoms or hydrogen.

The units of the formula (IIb) —$CR^6_2$—$CR^7_2$—$CR^8_2$—O— may be formed by a ring opening polymerisation reaction of an oxetane or a substituted oxetane, such as trimethylolpropaneoxetane (TMPO), having one or more organic groups instead of a hydrogen. The organic groups may in embodiments comprise one or more functional groups, such as a hydroxyl group or an amine group. In exemplary embodiments, said units of the formula (IIb) may be readily obtainable in a random order arrangement in conjunction with ester units.

In an exemplary embodiment, n is equal to 4.

In a particular embodiment, the polyether polyester copolymer comprises ether units of the formula (IIc) —$CR^6_2$—$CR^7_2$—$CR^8_2$—$CR^9_2$—O—, wherein $R^6$, $R^7$, $R^8$ and $R^9$ independent of each other represent organic groups having 1 to 20 carbon atoms or hydrogen.

The units of the formula (IIc) —$CR^6_2$—$CR^7_2$—$CR^8_2$—$CR^9_2$—O— may be formed by a ring opening polymerization reaction of a furan, such as tetrahydrofuran (THF) or a substituted tetrahydrofuran. The organic groups may in embodiments comprise one or more functional groups, such as an hydroxyl group or an amine group.

In a particular embodiment, the polyether polyester copolymer is a branched copolymer having at least one unit, which has at least three bonds to other units of the polyether polyester copolymer. In an example, in a ring opening polymerisation reaction of a trimethylolpropaneoxetane monomer three bonds to other units of the polyether polyester copolymer may be formed. In this way, a branched copolymer is formed having at least one trimethylolpropane unit, which has three bonds to other units of the polyether polyester copolymer.

In an exemplary embodiment, in step a) of the process the cyclic ether comprises a hydroxyl group. In an example, the cyclic ether is a trimethylolpropaneoxetane monomer, which has one hydroxyl group. The functional group of the cyclic ether may additionally react with another cyclic ether or cyclic ester to form an ether unit, which has at least three bonds to other units of the polyether polyester copolymer. In this way a branched copolymer is formed.

The branched structure of the polyether polyester copolymer further reduces a tendency of the polyether polyester copolymer segment of the polymer towards crystallization.

In an exemplary embodiment, in step a) the at least one functional group of the chain starter compound starts the forming of at least two chains.

In this embodiment, the at least one functional group of the chain starter compound is multifunctional by starting the forming of at least two chains from the same chain starter compound. As such, the multifunctional chain starter compound enables that at least two branches of the polyether polyester copolymer are formed during step a). In embodiments, the at least one functional group of the chain starter compound is difunctional, trifunctional or polyfunctional. The at least one functional group of the multifunctional comprises one or more functional groups selected from a hydroxyl group and an amine group. In case of hydroxyl groups, at least two hydroxyl groups are present. In case of an amine group, at least one primary amine group is present or at least two secondary amine groups is present to enable that at least two branches of the polyether polyester copolymer are formed in step a). Examples of the multifunctional chain starter compounds having at least two hydroxyl groups are further described in US2010/0240842, paragraphs [0029]-[0032], which are hereby incorporated by reference.

In an example, a multifunctional chain starter compound having a primary amine group may be selected from an allyl amine and a substituted allyl amine comprising at least one of an alkyl group and an aryl group.

In exemplary embodiment, the chain starter compound comprises an allyl group. The allyl group of the chain starter compound may be used to couple the resulting polyester polyether copolymer segment to a polysiloxane segment.

The polyether polyester copolymer segment according to the present invention may comprise a functional group, which in embodiments is selected from an —OH group and an aliphatic group having a double bond, such as a vinyl group or an allyl group.

Preferably, the polyether polyester copolymer segment has one allyl-functional group.

In a preferred example, the polyether polyester copolymer segment may be presented by the structural formula (III) below:

in which Z is hydrogen or an alkyl group having 1 to 4, preferably 1 or 2, carbon atoms or a monovalent radical of a polyether polyester copolymer chain and Y is a monovalent radical of a polyether polyester copolymer chain.

A polyether polyester copolymer chain comprises ether units and ester units. At least a part of the polyether polyester copolymer chain has ether and ester units, which are preferably arranged in random order. The polyether polyester copolymer chain may be formed from at least one cyclic ether and at least one cyclic ester in a ring-opening polymerization reaction. The cyclic ether may be selected from the group consisting of an epoxide functional component having at least one ether radical group of formula —$R^2$—O—$R^3$, an oxetane and a furan.

The epoxide functional component may be selected from the group consisting of glycidyl ether, alkyl substituted glycidyl ether, aryl substituted glycidyl ether, aralkyl substituted glycidyl ether and mixtures thereof.

The oxetane may be selected from the group consisting of 1,3-propylene oxide and trimethylolpropaneoxetane (TMPO).

The furan may be tetrahydrofuran (THF) and may be substituted furan, such as 2-methyltetrahydrofuran, and mixtures thereof.

Preferably, the cyclic ester is selected from the group consisting of ε-caprolactone, valerolacton and mixtures thereof, more preferably is selected to be ε-caprolactone.

The preparing of a polyester polyether copolymer segment by reacting a cyclic ester and a cyclic ether together in a ring-opening polymerization reaction may be carried out such that the ether and ester units of the polyester polyether copolymer segment are arranged in random order. In an embodiment, the cyclic ester and the cyclic ether may be mixed together before being brought into reaction conditions. In an example, a mixture of the cyclic ester and the cyclic ether may be controllably, e.g. dropwise, added to a reaction mixture such that the ether and ester units of the polyester polyether copolymer segment are polymerized in random order.

In a preferred example, said polyether polyester copolymer chain may have the following formula: -L-(ε-caprolactone/cyclic ether) copolymer—E In which the cyclic ether is selected from the group consisting of an epoxide functional component having at least one ether radical group of formula —$R^2$—O—$R^3$, and an oxetane;

L is a linking group (also called "linker");

ε-caprolactone/cyclic ether is a random copolymer of ε-caprolactone and at least one cyclic ether; and E is an end-group.

In preferred embodiments, the linker L is a saturated aliphatic radical, which in particular embodiments may contain heteroatoms, preferably oxygen atoms. More preferably, L is a heteroatom-free, saturated aliphatic hydrocarbon radical. In the context of the present invention the term "aliphatic radical"—as is usual in the chemical nomenclature—includes acyclic and cyclic aliphatic radicals.

Said end-group E may be a hydroxyl group. In embodiments, the hydroxyl group end-group may be blocked. By way of examples of blocking, mention may be made of methylation, acrylation, acetylation, esterification and conversion to the urethane by reaction with isocyanates.

Alternatively, other known modifications of hydroxyl groups may also be used. The mentioned modifications of end-groups of polyether polyester copolymer segments of the polymer may be completely and may be partially.

The allyl-functional group of the polyether polyester copolymer segment may be formed by using an allyl/hydroxyl functional component (e.g. allyl glycol) as a chain starter compound for starting the ring-opening copolymerization reaction using at least one cyclic ether monomer and at least one cyclic ester monomer. The polymerisation may takes place using an acidic catalyst.

After polymerization and neutralization of the resulting polyether polyester copolymer segment the modification block (e.g. the resulting allyl functional polyether polyester copolymer) is added to a polysiloxane using a hydrosilylation reaction. If needed an end group which is a hydroxyl group can be blocked (such as acetylated, alkylated, conversion reaction with isocyanate).

Instead of allyl glycol, which has a hydroxyl functional group, other chain starter compounds such as an amino functional starter may be used.

The at least one polysiloxane segment may be a catenated polysiloxane segment, a cyclic polysiloxanes segment, a branched polysiloxanes segment or a crosslinked polysiloxane segment. Preferably the at least one polysiloxane segment is selected from a catenated polysiloxane segment or a branched polysiloxane polysiloxane segment.

A branched polysiloxane segment may be prepared by an addition reaction, in particular a hydrosilylation reaction, of a —Si—H functional substituent of a polysiloxane precursor with a monovinyl functional polysiloxane precursor. Monovinyl functional polysiloxane precursors and such a hydrosilylation reaction is further described in WO2016/079319, in particular pages 4-8, which is hereby incorporated by reference.

The branched polysiloxane segment may enhance an anti-stick property and/or an easy to clean effect of compositions comprising the polymer according to the present invention.

In an exemplary embodiment, the link between the polyether polyester copolymer segment and the polysiloxane segment comprises the group —Si—O—$CHR^{10}$—, wherein $R^{10}$ represents hydrogen or an organic group having 1 to 10 carbon atoms.

In a reaction scheme, said link may be easily formed by condensing a —Si—H functional substituent of a polysiloxane precursor with a hydroxyl functional group of a polyether polyester copolymer segment. The condensation on Si—H groups may take place with elimination of hydrogen gas. Any suitable catalyst for this reaction may be used, for example, zinc acetylacetonate.

Monohydroxy-functional polyether polyester copolymer segments may be synthesized by ring-opening polymerization of a cyclic ester monomer and a cyclic ether monomer using monoalcohols as a chain starter compound. Usable monoalcohol chain starter compounds may be, for example, methanol, ethanol, butanol or allyl alcohol, allyl glycol or other starter alcohols, as for example fatty alcohols.

In an exemplary embodiment, the link between the polyether polyester copolymer segment and the polysiloxane segment comprises the group —Si—$CHR^{11}$—$CHR^{12}$—, wherein $R^{11}$ and $R^{12}$ independently represent hydrogen or an organic group having 1 to 10 carbon atoms. Said link may be easily formed by reacting a —Si—H functional substituent of a polysiloxane precursor with an aliphatic group of the polyether polyester copolymer segment having at least one double bond, such as a vinyl group or an allyl group. An aliphatic group in the context of the present invention encloses any acyclic aliphatic radicals and any cyclic aliphatic radicals.

In exemplary embodiments, the Si—H-functional polysiloxane has an alkyl-hydrogen-polysiloxane group, an aryl-hydrogen-polysiloxane group or an aralkyl-hydrogen-polysiloxane group. In preferred exemplary embodiments, the Si—H-functional polysiloxane has an alkyl-hydrogen-polysiloxane group where the alkyl groups it carries are $C_1$-$C_{14}$ alkyl groups, preferably $C_1$-$C_4$ alkyl groups, and more preferably methyl groups. In embodiments, the alkyl groups may carry additional aryl groups (the polysiloxanes then being referred to as polysiloxanes carrying aralkyl groups). In case there are aralkyl groups in the polysiloxane, they contain preferably 7 to 14 carbon atoms.

Alternatively, the Si—H functional group may also carry aryl groups. In case there are aryl groups in the polysiloxane, they preferably contain 6 to 14 carbon atoms. It is also possible to employ a Si—H-functional group which carries at least two groups selected of alkyl groups, aryl groups and aralkyl groups. In a preferred example, the Si—H-functional polysiloxane has a methyl-hydrogen-polysiloxane group (page 8, starting compounds).

In exemplary embodiments, the polysiloxane segment of the polymer may be suitably based on mono Si—H functional polysiloxane building blocks having a suitable number average molecular weight. Such polysiloxane building blocks can be represented by formula (IV):

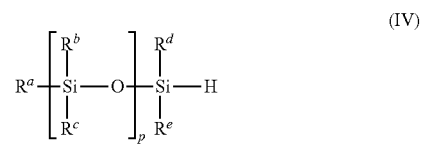

wherein parameter p is in the range of from 2 to 150; preferably from 2 to 100, more preferably from 5 to 70, and $R^a$, $R^b$, $R^c$, $R^d$ and $R^e$ independently of one another represent a linear, saturated, halogenated or non-halogenated alkyl group with 1 to 30 carbon atoms, more preferably with 1 to 20 carbon atoms, even more preferably with 1 to 10 carbon atoms, still more preferably, with 1 to 8 carbon atoms, in particular with 1 to 4 carbon atoms, most preferably with 1 to 2 carbon atoms or with carbon atom only, a branched, saturated, halogenated or non-halogenated alkyl group with 3 to 30 carbon atoms, more preferably with 3 to 20 carbon atoms, even more preferably with 3 to 10 carbon atoms, still more preferably, with 3 to 6 carbon atoms, an aryl group with 6 to 30 carbon atoms, preferably with 6 to 15 carbon atoms, an alkylaryl group or arylalkyl group, in each case with 7 to 30 carbon atoms, preferably with 7 to 20 carbon atoms, or an alkoxyalkyleneoxide residue or an alkoxypolyalkyleneoxide residue, wherein the alkylene unit is in each case preferably a $C_2$-$C_4$, more preferably an $C_2$- and/or $C_3$-alkylene unit.

Compounds of formula (IV) can be prepared by well-known methods. For example, such mono-Si—H functional polydialkylsiloxanes can be produced by a living polymerization of cyclic siloxanes, such as hexamethylene cyclotrisiloxane. The termination can be e.g. achieved by use of a silane. Such method is e.g. disclosed by Suzuki in Polymer, 30 (1989) 333, in WO 2009/086079 A2, EP 1 985 645 A2 and US 2013/0041098 A1.

Scheme 1

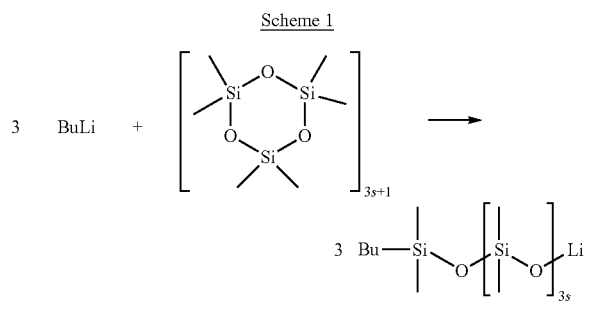

The functionalization of the end group, i.e. formation of the single Si—H-bond can then be performed by reaction with e.g. chlorosilanes, such as dimethylchlorosilane as illustrated below in Scheme 2:

Scheme 2.

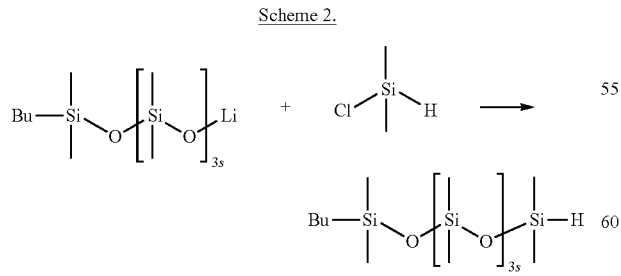

Alternatively, in exemplary embodiments the polysiloxane segment of the polymer may be suitably based on di-functional polysiloxane building blocks having Si—H functional groups at each end of a catenated polysiloxane building block and having a suitable number average molecular weight. Such polysiloxane building blocks can be represented by formula (V):

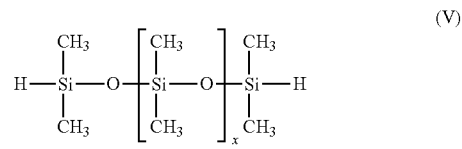

wherein x represents a number from 0 to 250, preferably from 1 to 100, more preferably from 4 to 70.

Compounds of formula (V) can be prepared by well-known methods.

Preferably, the polysiloxane building block as represented by anyone of the formulas (IV) and (V) is selected from a polydimethylsiloxane building block and a polymethylphenylsiloxane building block.

Alternatively, in exemplary embodiments the polysiloxane segment of the polymer may be suitably based on functional polysiloxane building blocks having Si—H functional groups at one or more intermediate siloxane positions along a catenated polysiloxane building block and having a suitable number average molecular weight. Such polysiloxane building blocks can be represented by formula (VI) or (VII):

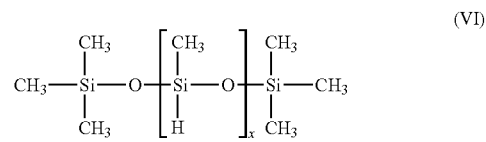

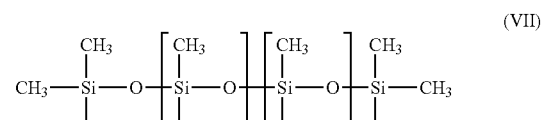

wherein x represents a number from 1 to 250, preferably from 1 to 100, more preferably from 4 to 50, and y represents a number from 0 to 250, preferably from 1 to 100, more preferably from 4 to 70.

Alternatively, in exemplary embodiments the polysiloxane segment of the polymer may be suitably based on functional polysiloxane building blocks having Si—H functional groups at one or more intermediate siloxane positions along a catenated polysiloxane building block and having Si—H functional groups at one or both ends of the catenated polysiloxane building block. Such polysiloxane building blocks can be represented by formula (VIII):

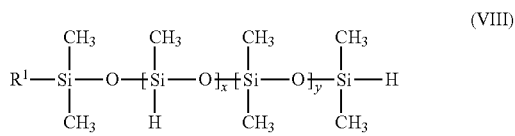

wherein x represents a number from 0 to 250, preferably from 1 to 100, more preferably from 4 to 50, y represents a number from 0 to 250, preferably from 1 to 100, more preferably from 4 to 70, and $R^1$ is —H or a —$CH_3$ substituent.

A polysiloxane building block as represented by any one of formula (V), (VI), (VII) or (VIII) may have one or more substituents instead of the —CH$_3$ substituent shown, which substituent is selected from a linear, saturated, halogenated or non-halogenated alkyl group with 1 to 30 carbon atoms, a branched, saturated, halogenated or non-halogenated alkyl group with 3 to 30 carbon atoms, an aryl group with 6 to 30 carbon atoms, an alkylaryl group or arylalkyl group, in each case with 7 to 30 carbon atoms, or an alkoxyalkyleneoxide residue or an alkoxypolyalkyleneoxide residue, wherein the alkylene unit is in each case preferably a C$_2$-C$_4$, more preferably an C$_2$- and/or C$_3$-alkylene unit.

Compounds of formula (VII) and (VIII) can be prepared by well-known methods, such as disclosed in Noll (Chemie and Technologie der Silicone, Wiley/VCH, Weinheim, 1984).

In exemplary embodiments, the polysiloxane segment of the polymer has a number of siloxane repeating units from 3 to 100, preferably from 6 to 70.

In particular embodiments, the ratio of number of Si—H groups to the number of siloxane repeating units in the polysiloxane segment is from 1:20 to 1:2. In any case, the total number of Si—H groups of the polysiloxane segment of the polymer is at least 1 and at most 50.

A coupling of the monoallyl-functional polyether polyester copolymer segment to the polysiloxane segment having at least one Si—H group may be formed by hydrosilylation reaction.

Hydrosilylation catalysts employed are preferably noble metals/their compounds, such as platinum, rhodium, and palladium and their compounds, more preferably platinum compounds. Especially preferred platinum compounds are hexachloroplatinic acid, alcoholic solutions of hexachloroplatinic acid, complexes with platinum and aliphatic, unsaturated hydrocarbon compounds; and platinum-allylsiloxane complexes. It is also possible, however, to use platinum black and platinum on activated carbon. If, for example, a platinum compound is used, 1 to 50 ppm as platinum metal are preferably added.

The hydrosilylation may takes place under the following conditions: The SiH-functional polysiloxane is introduced at room temperature. Then, under a nitrogen atmosphere, the content of the reactor is heated, for example to at least 85° C. A hydrosilylation catalyst is added, such as Karstedt catalyst or one of the other aforementioned catalysts. Depending on the anticipated exothermic nature of the reaction, some or all of the monoallyl-functional component is added. The exothermic reaction, which then proceeds, raises the temperature. Normally attempts are made to maintain the temperature within a range from 90° C. to 120° C. If some of the monoallyl-functional components still have to be metered in, the addition is made in such a way that the temperature remains in the range from 90° C. to 120° C. Following complete addition, the temperature is maintained for some time more at 90° C. to 120° C. The progress of the reaction may be monitored by gas-volumetric determination of the remaining SiH groups or by infrared spectroscopy (absorption band of the silicon hydride at 2150 cm 1). If necessary, an alcoholic gelling inhibitor as described in U.S. Pat. No. 5,512,640 may be added. The resulting polymers of the invention preferably contain no Si—H groups.

In an exemplary embodiment, the number average molecular weight of the polymer is in the range of 600 to 40.000 g/mol.

The number average molecular weight of the inventive polymers can be determined via GPC using polystyrene standards and toluene as eluent.

In an exemplary embodiment, one or two polyester polyether copolymer segments are linked to one polysiloxane segment.

In a particular exemplary embodiment, the one or two polyester polyether copolymer segments are linked to one polysiloxane segment at one chain end of the polysiloxane segment or two chain ends of the polysiloxane segment, respectively.

In a particular exemplary embodiment, one polyester polyether copolymer segment is linked to one polysiloxane segment at one chain end of the polysiloxane segment, wherein the polysiloxane segment has a linear structure. Such a polymer having a polyester polyether copolymer segment linked to the polysiloxane segment at one chain end of the polysiloxane segment may be obtained from a polysiloxane building block represented by formula (IV).

In a particular exemplary embodiment, two polyester polyether copolymer segments are linked to one polysiloxane segment, and the polysiloxane segment has a linear structure, wherein a polyester polyether copolymer segment is linked to the polysiloxane segment at each chain end of the polysiloxane segment. Such a polymer having a polyester polyether copolymer segment linked to the polysiloxane segment at each chain end of the polysiloxane segment may be obtained from a polysiloxane building block represented by formula (V).

In another example of the exemplary embodiment, the polymer has a comblike structure, wherein the 2 to 5 polyester polyether copolymer segments are linked to the polysiloxane segment distributed along the chain of the polysiloxane segment. Such a polymer having a polyester polyether copolymer segment linked as side chains to the polysiloxane segment may be obtained from a polysiloxane building block represented by formula (VI), (VII) or (VIII).

In particular embodiments, the 2 to 5 polyester polyether copolymer segments, which are linked to the polysiloxane segment, may be substantially equal to one another and may be different from one another in at least one aspect. The polyester polyether copolymer segments may be different in respect to one or more aspects, such as chain length or molecular weight of the polyester polyether copolymer segments and monomeric ester units and/or ether units of the polyester polyether copolymer segments.

In an example, the monomeric ester units and/or ether units of a first polyester polyether copolymer segment (e.g. caprolactone and glycidol) is different from the monomeric ester units and/or ether units of a second polyester polyether copolymer segment (e.g. caprolactone and trimethylolpropane oxetane (TMPO)).

In an alternative exemplary embodiment, 2 to 5 polysiloxane segments are linked to one polyester polyether copolymer segment.

In a particular example of the exemplary embodiment, two polysiloxane segments are linked to one polyester polyether copolymer segment, and the polymer has a linear structure, wherein a polysiloxane segment is linked to the polyester polyether copolymer segment at each chain end of the polyester polyether copolymer segment. In another particular example of the exemplary embodiment, the polymer has a comblike structure, wherein the 2 to 5 polysiloxane are linked to the polyester polyether copolymer segment distributed along the chain of the polyester polyether copolymer segment.

In some embodiments, the polymer of the invention carries functional groups, in particular functional groups, which are capable of participating in curing reactions of a system or a matrix to which the polymer of the invention is added to improve surface properties. The type of functional groups is not particularly limited and may be selected to match functional groups, which may be present in a system to which the polymer is added. Examples of functional groups include hydroxyl groups, carboxylic acid groups, amino groups, etherified amino groups, amide groups, epoxide groups, alkoxysilyl groups, ethylenically unsaturated polymerizable groups, and combinations thereof. Said systems preferably comprises an organic binder, which has crosslinkable functional groups. The systems generally include systems based on unsaturated polyesters, epoxy, polyurethane or dissolved acrylate resins. The applications include coatings, fiber-reinforced plastics (FRP, CFRP), mold construction, roof coating/floor covering, electrical insulation systems, adhesive formulation, printing ink and polymer concrete.

In another aspect of the present invention a composition is provided which is liquid at a temperature of 23° C. and which comprises the polymer according to the present invention.

Said composition may easily be applied onto a surface of a substrate at 23° C. due to its liquid phase and may modify said surface in response to a surface activity of the polymer of the present invention on said surface.

In some embodiments, the polymer according to the invention, optionally including an additional binder present in the composition, is liquid at 23° C. In such cases, the composition may be liquid at ambient temperature without the need of a liquid volatile diluent. In other embodiments, it may be required or desirable to render the composition liquid or to achieve a desired viscosity by including a volatile diluent. The volatile diluent may be water or an organic solvent, or mixtures thereof. Hence, the composition may be an aqueous composition or a non-aqueous composition.

The organic solvent may be any one of a glycol ether, an alcohol, an ester, a ketone, an aromatic hydrocarbon, and an aliphatic hydrocarbon.

In a still further embodiment, the polymer can be included in the liquid composition as an aqueous or non-aqueous emulsion or dispersion.

In an exemplary embodiment of the composition, the polymer according to the present invention is present in an amount of 0.05 to 10.0% by weight, calculated on the weight of the composition.

Said polymer according to the present invention has the technical advantage that a higher amount of the polymer can be dissolved in a volatile diluent or in a liquid binder to form the liquid composition while reducing the risk of crystallization of the polymer from the liquid at low temperatures. In particular, the polymer does substantially remain in a dissolved state at said low temperatures. In this way, sedimentation of the polymer or forming of turbidity in the liquid composition at low temperatures is prevented.

In a preferred example, the polymer according to the present invention is present in an amount of 0.1 to 5.0% by weight, calculated on the weight of the composition, more preferably 0.1 to 3.0% by weight.

In an exemplary embodiment of the composition, the composition further comprises an organic polymer.

In an example, said organic polymer may be any suitable organic polymer depending on the intended use of the composition. Said organic polymer may be selected from any suitable thermoplastic polymer and any suitable crosslinkable polymer.

The thermoplastics produced using the polymer of the invention are poly(meth)acrylates, polyacrylonitrile, polystyrene, styrenic plastics (e.g. ABS, SEBS, SBS), polyesters, polyvinyl esters, polycarbonates, polyethylene terephthalate, polybutylene terephthalate, polyamides, thermoplastic polyurethanes (TPU), polyvinyl chloride, polyoxymethylene, polyethylene or polypropylene. The thermoplastics may be filled and/or pigmented. The term "thermoplastics" in the sense of the invention also embraces blends of different kinds of thermoplastics. The thermoplastics may also, for example, be spinnable thermoplastic fibres known to a person of ordinary skill in the art, such as polyester fibres or polyamide fibres, for example.

A crosslinkable polymer as defined herein has at least one crosslinkable functional group. Any customary crosslinkable functional group known to the skilled person is contemplated here. More particularly the crosslinkable functional groups are selected from the group consisting of hydroxyl groups, amino groups, carboxylic acid groups, and unsaturated carbon double bonds, isocyanates, polyisocyanates, and epoxides such as ethylene oxides. The crosslinkable polymer may be exothermically or endothermically crosslinkable or curable. The crosslinkable polymer is crosslinkable or curable preferably in a temperature range from −20° C. up to 250° C. The crosslinkable polymer is preferably selected from the group consisting of epoxide resins, polyesters, wherein the polyesters may be unsaturated, vinyl ester-based resins, poly(meth)acrylates, polyurethanes, polyureas, polyamides, polystyrenes, polyethers, polycarbonates, polyisocyanates, and melamine formaldehyde resins. These polymers may be homopolymers or copolymers. These resins and their preparation are known to the skilled person.

In another aspect of the present invention a process is provided of coating a substrate comprising the steps of:
a) applying a liquid composition according to the present invention to the surface of a substrate, and
b) allowing or causing the applied composition to solidify.

The process of coating a substrate by applying a liquid composition according to the present invention provides the advantage that a coating formed on the surface may be more homogenous. Examples of advantageous modifications of the surface of the substrate are improved substrate wetting, improved leveling of the coating, enhanced gloss and avoidance or reduction of cratering defects of the coating on the substrate. The applying step may be performed by any known application method for applying the liquid composition, such as spraying, brushing, wiping, depositing, stamping or any other known application method of applying the liquid composition to the surface of a substrate.

The solidification allowing step of the applied composition may be any known step of solidifying a liquid composition, such as drying the composition, heating the composition, removing solvent from the composition, evaporation of solvent, causing crosslinking reactions, such as thermosetting the composition, causing a curing of the composition and any other known solidification method.

A proper processability and/or flowability of the liquid composition of the present invention is maintained even at low temperatures due to the use of the polymer of the present invention.

In an exemplary embodiment of the coating process, step b) is carried out by evaporation of solvent or crosslinking reactions or combinations thereof.

In another aspect of the present invention a use is provided of the polymer according to present invention as surface active additive for adapting the surface properties of materials selected from coating materials, molding compounds, and thermoplastic compounds.

In examples, the polymer may be used as surface active additive for controlling an interface of a coating material to a substrate, may be used as surface active additive for adapting an outer surface of a coating material and combinations thereof. In particular examples, the polymer may be active at the surface of the coating material before allowing the coating material to solidify, the polymer may be active at the surface of the coating material after allowing the coating material to solidify and combinations thereof.

In other examples, the polymer may be used as surface active additive for controlling a surface of a molding compound, such as for providing enhanced release properties of the molding compound from a mould or any other processing parts.

In other examples, the polymer may be used as surface active additive for adapting a surface of a thermoplastic compound. The polymer may be mixed with the thermoplastic compound during processing and/or molding of the thermoplastic compound.

Anyone of the coating materials, molding compounds and the thermoplastic compounds using the polymer of the invention may be used in pigmented or unpigmented form.

Additionally or alternatively, anyone of the coating materials, molding compounds and thermoplastic compounds may further comprise fillers, such as calcium carbonate and aluminum hydroxide, and reinforcing fibers, such as glass fibers, C fibers, and aramid fibers.

Furthermore, anyone of the coating material, molding compound and thermoplastic compounds may further comprise other customary additives.

These additives are preferably selected from the group consisting of emulsifiers, flow control assistants, solubilizers, defoaming agents, stabilizing agents, preferably heat stabilizers, process stabilizers, and UV and/or light stabilizers, catalysts, waxes, flexibilizers, flame retardants, reactive diluents, adhesion promoters, organic and/or inorganic nanoparticles having a particle size <100 nm, process aids, plasticizers, fillers, glass fibers, reinforcing agents, additional wetting agents and dispersants, light stabilizers, ageing inhibitors and mixtures of the aforesaid additives. Said additive content of the composition of the invention may vary very widely depending on intended use. The content, based on the total weight of the composition of the invention, is preferably 0.1 to 10.0 wt.-%, more preferably 0.1 to 8.0 wt.-%, very preferably 0.1 to 6.0 wt.-%, especially preferably 0.1 to 4.0 wt.-%, and particularly 0.1 to 2.0 wt.-%.

In exemplary embodiments, the coating materials preferably comprise at least one further organic polymer (binder) different from said polymer according to the present invention.

The coating materials of the invention are preferentially suitable for at least one of topcoats, antigraffiti coatings, release coatings, self-cleaning façade coatings, coatings which prevent icing, coatings which repel ice, especially for aircraft, dirt-repellent coatings, for vehicle bodies or alloy rims, dirt-repellent machine and instrument coatings, dirt-repellent furniture coatings, or marine coatings such as, for example, antifouling coatings, and dirt-repellent furniture and release-paper coatings, and also can and coil coatings.

The polymer according to the present invention may be used for leveling and/or wetting of the coating.

When the composition comprising the polymer of the invention is a coating composition, the coating composition are very suitable for preparing multilayer coating systems on a substrate. The multilayer coating systems comprise at least one undercoat layer and at least one topcoat layer, wherein at least one layer is based on a composition of the invention. In a preferred embodiment, the undercoat layer and the topcoat layer are based on a composition of the invention. Preferably, the undercoat layer and the topcoat layer have a common layer boundary. The undercoat layer and the topcoat layer may be prepared from different coating compositions, for example from a pigmented base coat composition for the undercoat layer and a non-pigmented clear coat composition for the topcoat layer. Alternatively, the undercoat layer and the topcoat layer may be prepared from the same coating composition.

The coating materials comprising the polymer of the invention are preferentially suitable for enhancing an adhesion of a coating to a substrate and/or enhancing an adhesion of a coating to an undercoat layer in a multilayer coating system.

The polymer according to the present invention may be used as additive in one layer or in all layers of a multilayer coating system.

In exemplary embodiments, anyone of the coating material, the molding compound and the thermoplastic compound comprise the polymer of the invention as additive in an amount from 0.1 to 10 wt %, preferably from 0.5 to 7.5 wt %, more preferably from 1 to 5 wt %, based on the total weight of the coating material, the molding compound and the thermoplastic compound, respectively.

The coating materials produced with the polymer of the invention may be applied to any suitable substrate, such as, for example, wood, paper, glass, ceramic, plaster, concrete, and metal. The coatings materials may also be applied, in a multicoat procedure, to electrocoats, primers, surfacers or basecoats and topcoats.

An optional curing process of the coating materials is dependent on the particular type of crosslinking, and may take place within a wide temperature range from, for example, −10° C. to 250° C. Even when cured at room temperature, surprisingly, coating materials produced with the polymer of the invention exhibit very good antiadhesive, dirt-repellent properties.

In exemplary embodiments, the molding compounds produced with the polymer of the invention further comprises anyone polymer selected from the group consisting of lacquer resins, alkyd resins, polyester resins, epoxy resins, polyurethane resins, unsaturated polyester resins, vinyl ester resins, polyethylene, polypropylene, polyamides, polyethylene terephthlate, PVC, polystyrene, polyacrylonitrile, polybutadiene, polyvinyl chloride or mixtures of these polymers or any copolymers thereof.

Because of the exceptionally good antiadhesive effect of the coatings obtained from the coating materials of the invention, even oily substances such as mineral oils, vegetable oils or oily preparations can be repelled. As an example, containers coated with the coating materials allows containers to be emptied completely. Accordingly, coating materials in accordance with the invention are outstandingly suitable as internal coating materials for the coating of drums, canisters or cans.

EXAMPLES

The examples below illustrate the invention without restrictive effect:

Formation of Starting Compounds: Preparation of a Polyether Polyester Copolymer Having a Random Order.

Example 1

Reaction of a Mixture of ε-Caprolactone and Cresylglycidylether Using Allylglycol as Chain Starter Compound A dropping funnel was charged using 268.73 g of ε-caprolactone and 128.71 g of cresylglycidylether as an homogeneous mixture. A 500 ml 4-necked flask with stirrer, thermometer, reflux cooler and the dropping funnel was charged at room temperature with 52.11 g of allylglycol and was heated under a nitrogen atmosphere to 80° C. When this temperature was reached, 0.113 g of trifluoromethanesulphonic acid was added. Subsequently, the mixture of ε-caprolactone and cresylglycidylether was added dropwise in 2 hours time. Due to the exothermic reaction a temperature of 92° C. was temporarily attained. To determine an ending of the ring opening copolymerization reaction of the mixture of ε-caprolactone and cresylglycidylether each hour an epoxide-equivalentweight of the reaction mixture was titrimetrically determined. After one hour of reaction time, an additional amount of 0.113 g of trifluoromethanesulphonic acid was added. The reaction was ended 4 hours after the addition of the mixture. The remaining trifluoromethanesulphonic acid in the reaction mixture was neutralized by washing the reaction using 28.125 g of a 8.2% aqueous solution of sodiumhydrogencarbonate. Afterwards, the solvent phase was separated from the aqueous phase. The remaining water in the solvent phase was removed by using molecular sieve. The polyether polyester copolymer product formed was a slightly yellow viscous product.

The molar ratio of ε-caprolactone:cresylglycidylether used to synthesize the polyether polyester copolymer product was equal to 3:1. GPC indicates: Polydispersity: 1.59; $M_w$: 1911

Example 2

Reaction of a Mixture of ε-Caprolactone and $C_{12}$-$C_{14}$ Alkylglycidylether Using Allylglycol as Chain Starter Compound The polyether polyester copolymer was prepared in the same way as the polyether polyester copolymer of Example 1, however a mixture of 222.20 g of ε-caprolactone and 184.69 g of $C_{12}$-$C_{14}$ alkylglycidylether was added instead of ε-caprolactone and cresylglycidylether and 43.11 g of allylglycol was used as chain starter compound. The mol-ratio of ε-caprolactone:$C_{12}$-$C_{14}$ alkylglycidylether used to synthesize the polyether polyester copolymer product was equal to 3:1. GPC indicates: Polydispersity: 1.48; $M_w$: 2273

Example 3

Reaction of a Mixture of ε-Caprolactone and $C_{12}$-$C_{14}$ Alkylglycidylether Using Allylglycol as Chain Starter Compound The polyether polyester copolymer was prepared in the same way as the polyether polyester copolymer of Example 2, however a mixture of 270.53 g of ε-caprolactone and 132.26 g of $C_{12}$-$C_{14}$ alkylglycidylether was added, and 47.24 g of allylglycol was used as chain starter compound. The mol-ratio of the ε-caprolactone:$C_{12}$-$C_{14}$ alkylglycidylether used to synthesize the polyether polyester copolymer product was equal to 5:1. GPC indicates: Polydispersity: 1.5; $M_w$: 2310

Example 4

Reaction of a Mixture of ε-Caprolactone and Trimethylolpropaneoxetane Using Allylglycol as Chain Starter Compound The polyether polyester copolymer was prepared in the same way as the polyether polyester copolymer of Example 1, however a mixture of 260.76 g of ε-caprolactone and 88.65 g of trimethylolpropaneoxetane was added, and 50.59 g of allylglycol was used as chain starter compound. The mol-ratio of the ε-caprolactone:trimethylolpropaneoxetane used to synthesize the polyether polyester copolymer product was equal to 3:1. GPC indicates: Polydispersity: 1.82; $M_w$: 2427

Example 5

Reaction of a Mixture of ε-Caprolactone and Cresylglycidylether Using Allylglycol as Chain Starter Compound The polyether polyester copolymer was prepared in the same way as the polyether polyester copolymer of Example 1, however a mixture of 268.73 g of ε-caprolactone and 128.71 g of cresylglycidylether was added, and 52.11 g of allylglycol was used as chain starter compound. The mol-ratio of the ε-caprolactone:cresylglycidylether used to synthesize the polyether polyester copolymer product was equal to 3:1. GPC indicates: Polydispersity: 1.66; $M_w$: 2010

Example 6

Reaction of a Mixture of ε-Caprolactone and Trimethylolpropaneoxetane Using Allylglycol as Chain Starter Compound The polyether polyester copolymer was prepared in the same way as the polyether polyester copolymer of Example 1, however a mixture 308.05 g of ε-caprolactone and 104.50 g of trimethylolpropaneoxetane was added, and 37.45 g of allylglycol was used as chain starter compound. The mol-ratio of the ε-caprolactone:trimethylolpropaneoxetane used to synthesize the polyether polyester copolymer product was equal to about 3:1. GPC indicates: Polydispersity: 2.30; $M_w$: 4181

Comparison Example 1

Polymerisation Reaction of ε-Caprolactone Using Allylglycol as Chain Starter Compound The polyester copolymer was prepared in the same way as the polyether polyester copolymer of Example 1, however only 392.47 g of ε-caprolactone was added and 57.08 g of allylglycol was used as chain starter compound. GPC indicates: Polydispersity: 1.56; $M_w$: 2504

Comparison Example 2

The polyester copolymer was prepared in the same way as the polyether polyester copolymer of Example 1, however only 412.40 g of ε-caprolactone was added and 37.61 g of allylglycol was used as chain starter compound. GPC indicates: Polydispersity: 1.47; $M_w$: 3152

Example A

Reaction of a Methylhydrosiloxane having the Mean Average Formula $M^H{}_2 D_{9,6}$ and the polyether polyester copolymer of Example 1

A 250 ml 4-necked flask with stirrer, thermometer, reflux cooler and nitrogen inlet tube was charged at room temperature with 41.10 g of a methylhydrosiloxane having the mean average formula $M^H_2 D_{9,6}$, 108.57 g of the polyether polyester copolymer of Example 1 and 45 g of xylene and was heated under a nitrogen atmosphere to 75° C. When this temperature had been reached, 0.33 g of a Karstedt catalyst (0.2% strength by weight solution in xylene) was added. The temperature was increased to above 100° C. due to the reaction. After 0.5 hr at 100° C., a gas-volumetric determination of the remaining Si—H indicates a degree of conversion of 100%. The xylene was removed by using vacuum and a temperature of 130° C. The resulting polymer is a viscous product. The mol-ratio between the methylhydrosiloxane and the polyether polyester copolymer used was 1:1.3. GPC indicates: Polydispersity: 1.33; $M_w$: 6126

Example B

Reaction of a Methylhydrosiloxane Having the Mean Average Formula $M^H_2 D_{9,6}$ and the Polyether Polyester Copolymer of Example 2

The polysiloxane polyether polyester copolymer was prepared in the same way as the polysiloxane polyether polyester copolymer of Example A, however the polyether polyester copolymer of EXAMPLE 2 was used instead of the polyether polyester copolymer of EXAMPLE 1. The mol-ratio between the methylhydrosiloxane and the polyether polyester copolymer was 1:1.3. The resulting polymer was a viscous product. GPC indicates: Polydispersity: 3.14; $M_w$: 4229

Example C

Reaction of a Methylhydrosiloxane Having the Mean Average Formula $M^H_2 D_{9,6}$ and the Polyether Polyester Copolymer of Example 3

The polysiloxane polyether polyester copolymer was prepared in the same way as the polysiloxane polyether polyester copolymer of Example A, however the polyether polyester copolymer of EXAMPLE 3 was used instead of the polyether polyester copolymer of EXAMPLE 1. The mol-ratio between the methylhydrosiloxane and the polyether polyester copolymer was 1:1.3. The resulting polymer was a viscous product. GPC indicates: Polydispersity: 2.95; $M_w$: 4552

Example D

Reaction of a Methylhydrosiloxane Having the Mean Average Formula $M^H_2 D_{9,6}$ and the Polyether Polyester Copolymer of Example 4

The polysiloxane polyether polyester copolymer was prepared in the same way as the polysiloxane polyether polyester copolymer of Example A, however the polyether polyester copolymer of EXAMPLE 4 was used instead of the polyether polyester copolymer of EXAMPLE 1. The mol-ratio between the methylhydrosiloxane and the polyether polyester copolymer was 1:1.3. The resulting polymer was a viscous product. GPC indicates: Polydispersity: 2.15; $M_w$: 2723

Example E

Reaction of a Methylhydrosiloxane Having the Mean Average Formula $M^H_2 D_{9,6}$ and the Polyether Polyester Copolymer of Example 5

The polysiloxane polyether polyester copolymer was prepared in the same way as the polysiloxane polyether polyester copolymer of Example A, however the polyether polyester copolymer of EXAMPLE 5 was used instead of the polyether polyester copolymer of EXAMPLE 1. The mol-ratio between the methylhydrosiloxane and the polyether polyester copolymer was 1:1.3. The resulting polymer is a viscous product. GPC indicates: Polydispersity: 1.32; $M_w$: 6014

Example F

Acetylation Reaction of the Polysiloxane Polyether Polyester Copolymer of Example E A 250 ml 4-necked flask with stirrer, thermometer, reflux cooler and nitrogen atmosphere supply means was charged at room temperature with 89.82 g of the polysiloxane polyether polyester copolymer of EXAMPLE E and 10.18 g of acetic anhydride. The mixture was stirred, 0.025 g of methanesulphonic acid was added and the mixture heated to 110° C. After 3 hours reaction time the remaining acid and anhydride residues were removed by distillation using 10 g xylene as distillation medium under vacuum at 130° C. The reaction product was a viscous product. GPC indicates: Polydispersity: 1.37; $M_w$: 7017

Example G

Reaction of a Methylhydrosiloxane Having the Mean Average Formula $M^H_2 D_{20}$ and the Polyether Polyester Copolymer of Example 6

The polysiloxane polyether polyester copolymer was prepared in the same way as the polysiloxane polyether polyester copolymer of Example A, however 105.36 g of the polyether polyester copolymer of EXAMPLE 6 was used instead of the polyether polyester copolymer of EXAMPLE 1 and 44.64 g of a methylhydrosiloxane having the mean average formula $M^H_2 D_{20}$ was used. The mol-ratio between the methylhydrosiloxane and the polyether polyester copolymer was 1:1.3. The resulting polymer was a viscous product. GPC indicates: Polydispersity: 5.37; $M_w$: 9624

Example H

Acetylation Reaction of the Polysiloxane Polyether Polyester Copolymer of Example G A 250 ml 4-necked flask with stirrer, thermometer, reflux cooler and nitrogen atmosphere supply means was charged at room temperature with 63.13 g of the polysiloxane polyether polyester copolymer of EXAMPLE G and 11.87 g of acetic anhydride. The mixture was stirred, 0.008 g of methanesulphonic acid was added and the mixture heated to 110° C. After 3 hours reaction time the remaining acid and anhydride residues were removed by distillation using 4 g xylene as distillation medium under vacuum at 130° C. The reaction product was a viscous product. GPC indicates: Polydispersity: 5.20; $M_w$: 14663

Comparison Example I

Reaction of a Methylhydrosiloxane Having the Mean Average Formula $M^H_2 D_{9,6}$ and the Polyester Polymer Segment of COMPARISON Example 1

The polysiloxane polyester copolymer was prepared in the same way as the polysiloxane polyether polyester copolymer of Example A, however the polyester polymer segment of COMPARISON EXAMPLE 1 was used instead of the polyether polyester copolymer of EXAMPLE 1. The mol-ratio between the methylhydrosiloxane and the polyester polymer segment was 1:1.3. The resulting polymer was a viscous product. GPC indicates: Polydispersity: 2.13; $M_w$: 3277

Comparison Example J

Acetylation Reaction of the Polysiloxane Polyester Copolymer of Comparison Example I The acetylation reaction was carried out in the same way as the acetylation reaction according to EXAMPLE F, however the polysiloxane polyester copolymer of COMPARISON EXAMPLE I was used instead of the polysiloxane polyether polyester copolymer of EXAMPLE E. The resulting polymer was a viscous product. GPC indicates: Polydispersity: 1.62; $M_w$: 2602

Comparison Example K

Acetylation Reaction of the Polyester Polymer of COMPARISON Example 2

The acetylation reaction was carried out in the same way as the acetylation reaction according to EXAMPLE F, however the polyester copolymer of COMPARISON EXAMPLE 2 was used instead of the polysiloxane polyether polyester copolymer of EXAMPLE E. The resulting polymer was a viscous product. GPC indicates: Polydispersity: 1.64; $M_w$: 3664

Comparison Example L

Reaction of a Methylhydrosiloxane Having the Mean Average Formula $M^H{}_2 D_{20}$ and the Acetylated Polyester Polymer Segment of Comparison Example K The polysiloxane polyester copolymer was prepared in the same way as the polysiloxane polyether polyester copolymer of Example A, however the acetylated polyester polymer segment of COMPARISON EXAMPLE K was used instead of the polyether polyester copolymer of Example 1. The mol-ratio between the methylhydrosiloxane and the polyester polymer segment was 1:1.1. The resulting polymer was a viscous product. GPC indicates: Polydispersity: 6.03; $M_w$: 10132

Table I shows the summary of the resulting Polysiloxane polymers. Several of these polymers were further tested on crystallization behavior and tested on stability as a concentrated solution.

Crystallization Measurement

The crystallization behavior of the polymers according anyone of EXAMPLES A-D, F and COMPARISON EXAMPLES I and J was measured using a DSC measurement method. A sample of each polymer was tested using a DSC Q2000 supplied by TA Instruments. The temperature program was as follows:

1. Equilibrate the sample at −80.00° C.
2. Heat the sample at heating rate 10.00° C./min up to 100.00° C.
3. Cool the sample at cooling rate 10.00° C./min down to −80.00° C.

A melting range was determined by integration from the heating ramp. A crystallization range was determined by integration from the cooling ramp.

Stability of Concentrated Solution

A concentrated solution was made of a polymer according anyone of EXAMPLES A-D, F and COMPARISON EXAMPLES I and J in solvent methoxypropyl acetate at 25 weight % solution of the polymer in the solvent. The concentrated solution was stored during 3 days at 4° C. After 3 days a visual observation was made of any turbidity formed, any sedimentation formed and/or any crystals formed in the solution.

Test results.

TABLE II

| | DSC results | |
|---|---|---|
| EXAMPLE | melting range (° C.) | crystallization range (° C.) |
| A | −24 to 26 | no crystallization |
| B | −33 to 23 | −14 to −57 |
| C | −27 to 34 | 7 to −58 |
| D | no melting | no crystallization |
| F | −27 to 23 | no crystallization |
| COMPARISON I | 9 to 50 | 0 to 21 |
| COMPARISON J | 10 to 51 | 0 to 22 |

The results show that the crystallization temperature range of the polymers according to the invention is reduced (for EXAMPLE B and C) compared to the COMPARISON EXAMPLES I and J or even no crystallization occurs (for EXAMPLE A, D and F).

TABLE I

Polysiloxane polyether polyester copolymers and the comparison examples

| EXAMPLE | Siloxane segment | Ester component | Ether component | Ratio (ester/ether) | End group |
|---|---|---|---|---|---|
| A | $M^H{}_2 D_{9.6}$ | Caprolactone | cresylglycidylether | 3:1 | OH |
| B | $M^H{}_2 D_{9.6}$ | Caprolactone | $C_{12}$-$C_{14}$ alkylglycidylether | 3:1 | OH |
| C | $M^H{}_2 D_{9.6}$ | Caprolactone | $C_{12}$-$C_{14}$ alkylglycidylether | 5:1 | OH |
| D | $M^H{}_2 D_{9.6}$ | Caprolactone | trimethylolpropaneoxetane | 3:1 | OH |
| E | $M^H{}_2 D_{9.6}$ | Caprolactone | cresylglycidylether | 3:1 | OH |
| F | $M^H{}_2 D_{9.6}$ | Caprolactone | cresylglycidylether | 3:1 | acetylated |
| G | $M^H{}_2 D_{20}$ | Caprolactone | trimethylolpropaneoxetane | 3:1 | OH |
| H | $M^H{}_2 D_{20}$ | Caprolactone | trimethylolpropaneoxetane | 3:1 | acetylated |
| COMPARISON I | $M^H{}_2 D_{9.6}$ | Caprolactone | n.a. | — | OH |
| COMPARISON J | $M^H{}_2 D_{9.6}$ | Caprolactone | n.a. | — | acetylated |
| COMPARISON K | $M^H{}_2 D_{20}$ | Caprolactone | n.a. | — | OH |
| COMPARISON L | $M^H{}_2 D_{20}$ | Caprolactone | n.a. | — | acetylated |

TABLE III concentrated solution stability after 3 days at 4° C.

| EXAMPLE | solution stability (25 weight % after 3 days at 4° C.) |
|---|---|
| A | clear solution |
| B | clear solution |
| C | clear solution |
| D | clear solution |
| F | clear solution |
| COMPARISON I | turbid and sedimentation |
| COMPARISON J | crystallized inside solution |

The results show that the concentrated solutions according to the EXAMPLES A-D and F remain stable during at least 3 days at 4° C., while the COMPARISON EXAMPLES I and J show instability.

Multilayer Coating Application

The application of the polymer according to EXAMPLE H as a silicone additive was tested in a multilayer coating using a clearcoat basis formulation, wherein the substrate- and intercoat adhesion of the multilayer coating was tested. The performance of a coating composition 1 using the polymer according to EXAMPLE H was compared to a CONTROL coating composition, which did not contain any silicone additive, compared to a COMPARISON coating composition 1, which comprises a polyether polysiloxane block copolymer, and a COMPARISON coating composition 2, which comprises the polymer according to COMPARISON EXAMPLE L. The polyether polysiloxane of the COMPARISON coating composition 1 is a random polyethylene oxide-polypropylene oxide (peo-ppo) copolymer segment, which is coupled to a polysiloxane chain at both ends of the polysiloxane chain. The end group of the random peo-ppo copolymersegment is acetylated.

The composition of the clearcoat basis formulation is shown in Table IV:

TABLE IV basis formulation for clear coat

|   | Raw Materials | Wt.[%] |
|---|---|---|
| 1 | Setalux 1760 VB 64 | 36.0 |
| 2 | Setalux 91767 | 13.3 |
| 3 | Luwipal 018 | 20.4 |
| 4 | Butyl glycol acetate | 1.7 |
| 5 | Solvesso 150 | 12.7 |
| 6 | Butanol | 12.9 |
| 7 | Butyldiglycol | 3.0 |
|   |   | 100.0 |

Setalux 1760 VB 64: Acrylic resin from Nuplex Resins
Setalux 91767: acrylic polyol resin from Nuplex Resins
Luwipal 018: melamine formaldehyde resin from BASF AG
Solvesso 150: aromatic solvent from ExxonMobil The clearcoat formulation was prepared by mixing components 1-7 by hand with a spatula, then mixing during 10 minutes with tooth blade.

The coating formulations were prepared by incorporation of the polysiloxane additives with dissolver 3 min. 1500 u/min. The coating formulations were stored for 24 h before application of the coating formulations. Table V shows the composition of the coating formulations.

TABLE V coat compositions for adhesion testing in multilayer coating

| Coating formulation | Polysiloxane additive | Weight[%] |
|---|---|---|
| CONTROL coating | None | 0.0 |
| Coating 1 | EXAMPLE H | 0.2 |
| COMPARISON coating 1 | polyether polysiloxane | 0.2 |
| COMPARISON coating 2 | COMPARISON EXAMPLE L | 0.2 |

In a next step, 50% of the formulation of each sample is colored black and 50% is colored pink by addition of a 1% pigment concentrate.

Preparation of Multilayer Coating

The following steps were performed to prepare the multilayer coating:
1. Sand (wet) primered metal panels with abrasive paper (grade P800), clean with Isopropanol;
2. First layer (black) application with 100 μm doctor blade on sanded panels;
3. 15 min flash off solvent at room temperature followed by 25 min baking in a gradient oven (using 4 different temperature zones with 120° C., 140° C., 160° C., 180° C.);
4. After baking and cool down second layer (pink) application with 100 μm doctor blade on first layer;
5. 15 min flash off followed by 25 min baking in an oven at 140° C.

Testing Adhesion

The adhesion of the resulting multilayered coating was tested using a cross-cut method according to ISO 2409 on primered metal panels with 2 mm distance. This Cross-Cut method is a procedure for assessing the resistance of a coating to separation from substrates/primers when a right angle lattice pattern is cut into the coating, penetrating through to the substrate.

The adhesion is assessed and categorized according to:
   ISO Class.: 0—The edges of the cuts are completely smooth; none of the squares of the lattice is detached.
   ISO Class.: 1—Detachment of small flakes of the coating at the intersections of the cuts. A cross-cut area not significantly greater than 5% is affected.
   ISO Class.: 2—The coating has flaked along the edges and/or at the intersections of the cuts. A cross-cut area significantly greater than 5%, but not significantly greater than 15%, is affected.
   ISO Class.: 3—The coating has flaked along the edges of the cuts partly or wholly in large ribbons, and/or it has flaked partly or wholly on different parts of the squares. A cross-cut area significantly greater than 15%, but not significantly greater than 35%, is affected.
   ISO Class.: 4—The coating has flaked along the edges of the cuts in large ribbons and/or some squares have detached partly or wholly. A cross-cut area significantly greater than 35%, but not significantly greater than 65%, is affected.
   ISO Class.: 5—Any degree of flaking that cannot even be classified by classification 4.

It was found that the baking conditions of 120, 140° C. and 160° C. all coatings showed good and no differences was found in adhesion performance between the coat formulations as all were categorized as ISO Class: 0.

However, at baking conditions of 180° C. differences in adhesion performance was found. The results of the adhesion test for the 180° C. condition are shown in Table VI:

TABLE VI adhesion performance of multilayer coating
of several coating formulations

| Coat formulation | Cross Cut [Class] at 180° C. |
|---|---|
| CONTROL coating | 1 |
| Coating 1 | 0 |
| COMPARISON coating 1 | 4 |
| COMPARISON coating 2 | 1 |

The sample COMPARISON coating 1 with the polyether polysiloxane shows a problem in interlayer adhesion at 180° C. The CONTROL coating and the COMPARISON coating 2 show crackling at cutting edges and a slight loss of adhesion at these failures. In the case of Coating 1 with the polymer of EXAMPLE H, the intercoat adhesion is not negatively influenced at all (the edges of the cuts are completely smooth).

Thus, the polysiloxane polymer according to the present invention shows a better performance in interlayer adhesion compared to a CONTROL coating without any polysiloxane polymer and compared to a COMPARISON coating 2 with a polyester polysiloxane copolymer.

The invention claimed is:

1. A polymer comprising:
at least one polyether polyester copolymer segment, wherein the polyether polyester copolymer comprises ether units of formula (II): —[CR$^1_2$]$_n$—O—, wherein n is an integer of 2 to 4, the R$^1$s independent of each other represent organic groups having 1 to 30 carbon atoms or hydrogen, and wherein when n is equal to 2, at least one of the R$^1$s represents an ether group having the formula —R$^2$—O—R$^3$, wherein R$^2$ and R$^3$ independent of each other represent organic groups having 1 to 30 carbon atoms, and
at least one polysiloxane segment linked to the at least one polyether polyester copolymer segment.

2. The polymer according to claim 1, wherein the at least one polyether polyester copolymer segment comprises at least two bonds of an ester unit to an ether unit.

3. The polymer according to claim 1, wherein the at least one polyether polyester copolymer segment comprises ester units and the ether units arranged in random order.

4. The polymer according to claim 1, wherein a mass ratio of the at least one polyether polyester copolymer segment with respect to the at least one polysiloxane segment is from 15: 85 to 75: 25.

5. The polymer according to claim 1, wherein the at least one polyether polyester copolymer segment further comprises ester units of formula (I): —(CH$_2$)$_5$—C(=O)—O—.

6. The polymer according to claim 1, wherein n is equal to 2 and the ether units include one ether group having the formula —R$^2$—O—R$^3$, wherein R$^2$ and R$^3$ independent of each other represent organic groups having 1 to 30 carbon atoms.

7. The polymer according to claim 1, wherein n is equal to 3.

8. The polymer according to claim 1, wherein a link between the at least one polyether polyester copolymer segment and the at least one polysiloxane segment comprises the group —Si—O—CHR$^{10}$—, wherein R$^{10}$ represents hydrogen or an organic group having 1 to 10 carbon atoms.

9. The polymer according to claim 1, wherein a link between the at least one polyether polyester copolymer segment and the at least one polysiloxane segment comprises the group —Si—CHR$^{11}$—CHR$^{12}$—, wherein R$^{11}$ and R$^{12}$ independently represent hydrogen or an organic group having 1 to 10 carbon atoms.

10. The polymer according to claim 1, wherein the polymer comprises a structure including 1 or 2 polyester polyether copolymer segments linked to one polysiloxane segment.

11. A process for preparing a polymer, the process comprising:
preparing a polyester polyether copolymer segment by reacting a cyclic ester and a cyclic ether in a ring-opening polymerization reaction, wherein the ring-opening polymerization reaction is started by includes initiation with a chain starter compound, the chain starter compound comprising one or more of a hydroxyl group and an amine group, and wherein the polyether polyester copolymer comprises ether units of formula (II): —[CR$^1_2$]$_n$—O—, wherein n is an integer of 2 to 4, the R$^1$s independent of each other represent organic groups having 1 to 30 carbon atoms or hydrogen, with the proviso that when n is equal to 2, at least one of the R$^1$s represents an ether group having the formula —R$^2$—O—R$^3$, wherein R$^2$ and R$^3$ independent of each other represent organic groups having 1 to 30 carbon atoms,
providing a polysiloxane having Si—H functional groups, and
covalently linking the polyester polyether copolymer segment and the polysiloxane.

12. The process according to claim 11, wherein preparing a polyester polyether copolymer segment further comprises substantially simultaneously adding the cyclic ester and the cyclic ether into a reaction mixture, and controlling reaction conditions to prepare the polyester polyether copolymer segment comprising ester units and the ether units arranged in random order.

13. The process according to claim 11, wherein the cyclic ether comprises a hydroxyl group.

14. The process according to claim 11, wherein the one or more of a hydroxyl group and an amine group of the chain starter compound starts the forming of at least two chains.

15. A composition comprising the polymer according to claim 1, the composition being a liquid at a temperature of 23° C.

16. The composition according to claim 15, wherein the polymer is present in an amount of 0.05 to 10.0% by weight, calculated on the weight of the composition.

17. The composition according to claim 15, wherein the composition further comprises an organic polymer.

18. A process of coating a substrate comprising:
applying the composition according to claim 15 to the surface of a substrate, the composition being in a liquid state during application, and
allowing or causing the applied composition to solidify.

19. The process according to claim 18, wherein allowing or causing the applied composition to solidify comprises one or more of evaporation of solvent and crosslinking reactions.

20. A coating composition comprising an organic polymer and a surface-active additive, the surface-active additive comprising the polymer according to claim 1.

21. A molding composition comprising a polymeric material and a surface-active additive, the surface-active additive comprising the polymer according to claim 1.

22. A thermoplastic composition comprising a thermoplastic polymer and a surface-active additive, the surface-active additive comprising the polymer according to claim 1.

* * * * *